United States Patent [19]

Weeks

[11] Patent Number: 5,081,941

[45] Date of Patent: Jan. 21, 1992

[54] APPARATUS FOR EXCAVATING AND TRANSPLANTING TREES AND THE LIKE

[76] Inventor: Paul R. Weeks, 6203 W. Nail Rd., Walls, Miss. 38680

[21] Appl. No.: 500,188

[22] Filed: Mar. 27, 1990

[51] Int. Cl.⁵ ............................................. A01G 23/04
[52] U.S. Cl. ..................................... 111/101; 37/2 R; 414/23
[58] Field of Search ................. 37/2 R, 2 P; 111/101; 83/928; 414/23

[56] References Cited

U.S. PATENT DOCUMENTS

| | | | |
|---|---|---|---|
| 4,286,398 | 9/1981 | Lemond et al. | 83/928 X |
| 4,403,427 | 9/1983 | Dahlquist | 111/101 |
| 4,625,662 | 12/1986 | Heinzen | 37/2 R X |
| 4,830,145 | 5/1989 | Hansen | 172/21 X |

*Primary Examiner*—Dennis L. Taylor
*Assistant Examiner*—Arlen L. Olsen
*Attorney, Agent, or Firm*—John J. Mulrooney

[57] ABSTRACT

A vehicle-mounted apparatus for excavating and transplanting trees includes a plurality of blade assemblies mounted on a multi-sided, horizontally disposed frame for overlying and substantially surrounding an excavation site. Each blade assembly includes a curved tower and a blade mounted on a slide assembly for reciprocation along the tower to effect penetration of the excavation site, and hydraulic power means for effecting reciprocation of the blade and slide. The slide assembly includes pliable, replaceable materials such as plastic and brass as the contact and sliding surfaces between the tower and the slide assembly. The tower is pivotable between a plurality of operational positions so as to be useful with a plurality of blades to remove sections of earth from the excavation area having different sizes, i.e., widths and depths, and having different shapes, e.g., a conical shape having parabolically curved sides or a truncated shape having parabolically curved sides. The blades are either a plurality of tree spade blades of a single size or, preferably, asymmetrical blades having different sizes which are positioned to effectively use the weight of the vehicle to excavate an earth section which remains intact about the root system of the tree.

17 Claims, 4 Drawing Sheets

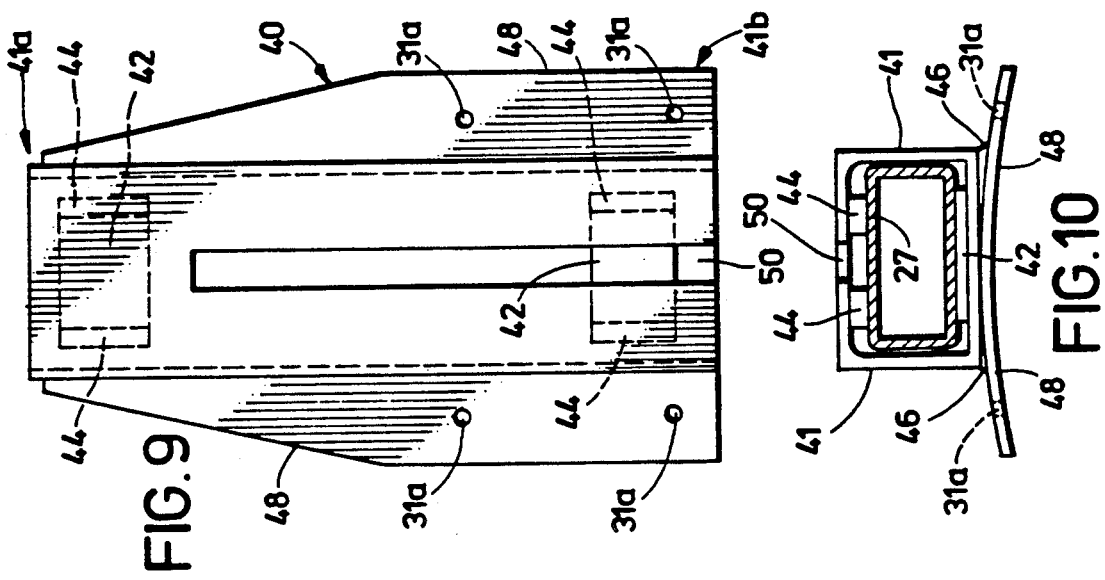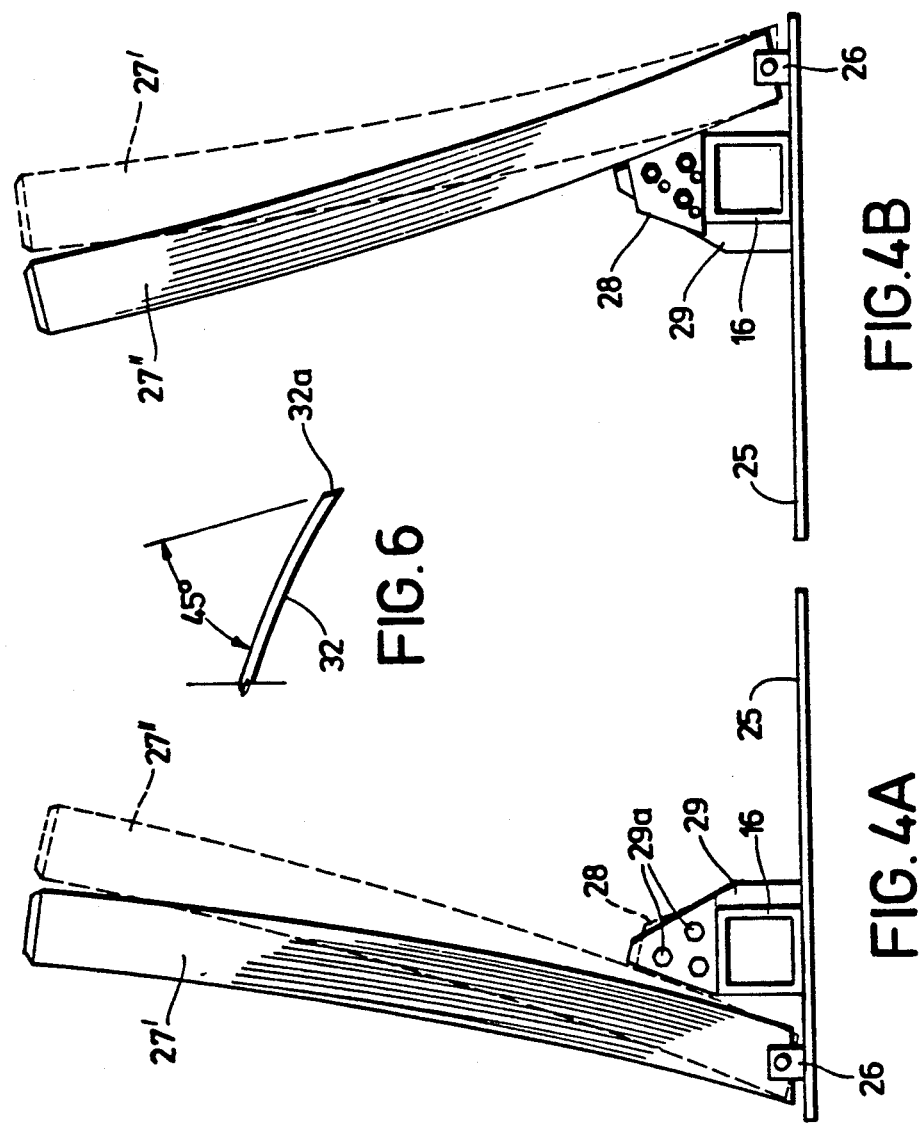

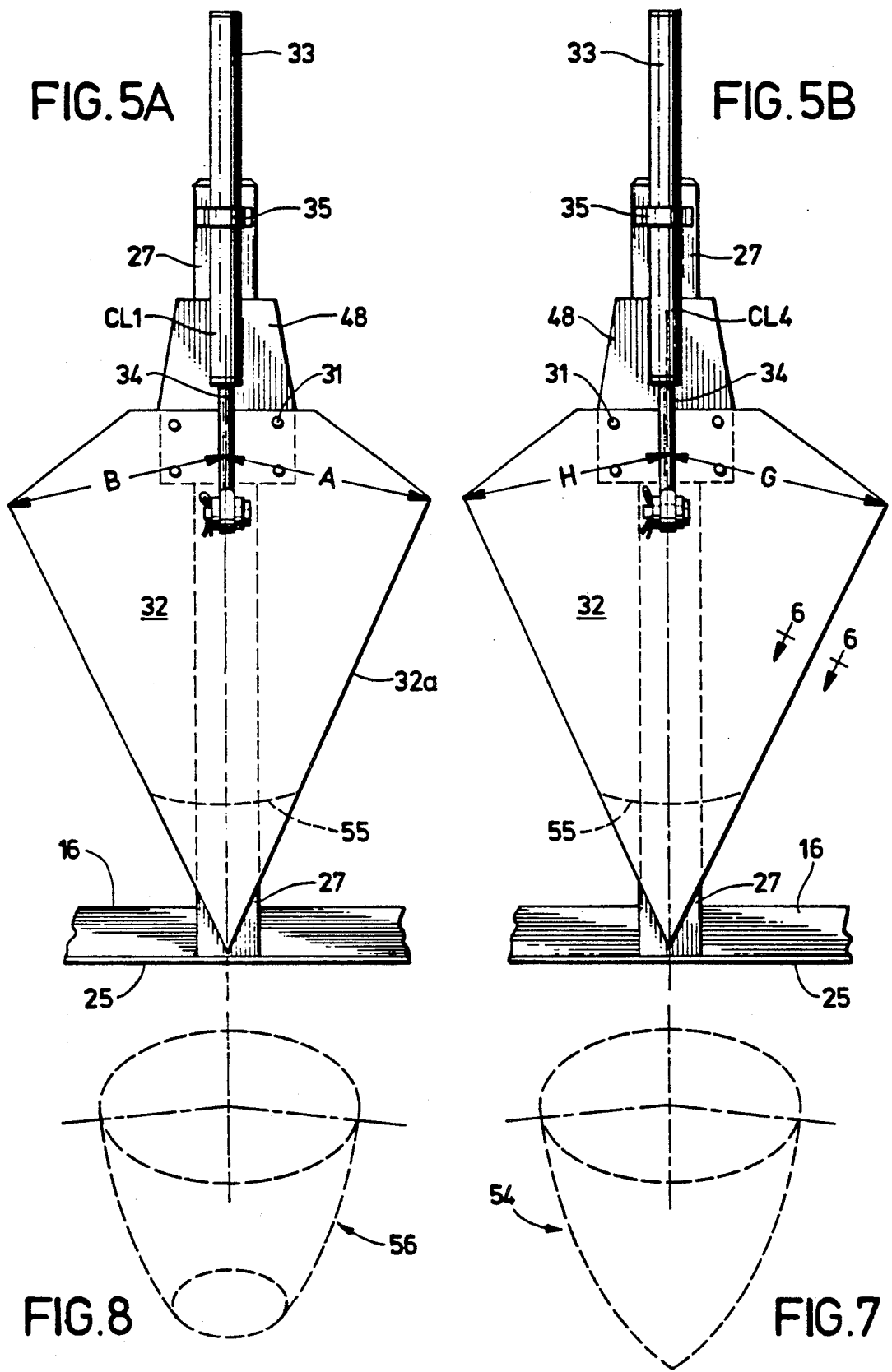

APPARATUS FOR EXCAVATING AND TRANSPLANTING TREES AND THE LIKE

BACKGROUND OF THE INVENTION

This invention relates to improvements in apparatus for excavating and transplanting trees and similar plants, and more particularly to a vehicle-mounted apparatus having a plurality of reciprocating blades adapted to pierce the ground surrounding a tree in such a way that a well-shaped protective ball of soil about the roots of the tree is maintained intact for protection of the tree during transportation and transplanting.

In the excavation and transplanting of trees, it is important to remove as much of the tree root system as possible when moving the tree from the original growing site. In order to accomplish this, devices have been developed for positioning cutting blades around the trunk of the tree for digging into and piercing the earth surrounding the tree in a manner for removal of as large a ball of dirt with the roots as possible. Such prior devices usually have a plurality of blades which are positioned at spaced points around the tree and then hydraulically driven on converging paths into the ground to form either a conical or truncated-shaped confinement for the root system and ball of earth. When all of the blades have been driven fully into the earth, the blades and their supporting framework are simultaneously lifted upwardly thereby raising the tree and the ball of earth out of the excavation hole. The tree may then be transplanted or the ball of earth may be wrapped with burlap and wire and then moved to a remote desired location. Generally, prior machines are capable of digging and lifting a tree in less time than the tree may be manually excavated and transplanted, and with less disturbance of the earth forming the ball about the roots and thus with less damage to the root system of the tree. However, the prior devices require a relatively large area free of trees, shrubbery, and any other obstructions adjacent the plant to be moved in order to provide sufficient space for the vehicle carrying the device to maneuver into position adjacent the tree and to move the blades into their positions around the tree for the excavation thereof. While such prior devices can be maneuvered satisfactorily in open spaces, in nurseries where trees and shrubs are normally grown close together on four foot centers along adjacent rows so as to allow for the raising of the maximum number of plants in a given area, the prior devices cannot be used in many situations because there is not sufficient room to position the machine at a particular plant without damaging the adjacent plants. Moreover, because of the height and width of the prior devices, some trees and shrubs having low branches cannot be moved with the prior devices without damaging such trees and shrubs. As a result, the transplanting of many trees and shrubs must still be done by the older, manual method.

In the excavation of trees and other plants with hydraulically powered tree spades, it is essential that the blades maintain a predetermined path as they penetrate the earth and converge to define an excavation area around the root system of the tree. If the blades deviate from the designed path, the root system may be excessively damaged or the dirt ball may not remain intact, either of which will cause loss of the tree. Also, the weights of the tree spade apparatus and the vehicle must be sufficient to offset the forces created by the blades penetrating the earth; insufficient weight of the vehicle and apparatus and/or improper positioning of that weight will permit unwanted additional movement of the blades and damages to the root ball. Heretofore, a variety of apparatus have been used in an attempt to insure that the blades reciprocate smoothly and converge properly to provide a dirt ball around the tree which is the desired size and shape and, more importantly, is intact. Some prior art devices employ housings which are complex and failure-prone assemblies, including arrangements of rollers, guide blocks, flanges and groves, gears, pens and groves and wheels and rails to restrain, maintain and guide the blade along a predetermined path. See, for example, Lemond U.S. Pat. No. 4,286,398 Bates U.S. Pat. No. 3,618,234 and Stocker U.S. Pat. No. 4,031,637. Another prior device, Grover U.S. Pat. No. 3,713,234, uses a pair of telescoping tubes to guide and direct the blade along the desired path. These prior devices have not been entirely satisfactory for several reasons including durability, mechanical failure, mechanical wear and difficulty to replace parts, and the general inability of the parts to move or slide smoothly relative to one another when dirt, rocks and other debris normally found at excavation sites gets between the parts which must move or slide relative to adjacent parts. Such dirt, rocks and debris cause these prior devices to bind or jam and require frequent stops for cleaning.

SUMMARY OF THE INVENTION

Accordingly, it is a general object of this invention to provide a novel and improved apparatus for excavating and transplanting trees and the like.

Another object of this invention is to provide such excavating and transplanting apparatus having new and improved means for attaching, directing, guiding and maintaining the blades thereof for penetration of the earth on the predetermined, desired path of convergence.

Another object of this invention is to provide such excavating and transplanting apparatus having novel blades which are asymmetrical.

Another object of this invention is to provide such excavating and transplanting apparatus which uses blades of more than one size at the same time.

Another object of this invention is to provide such excavating and transplanting apparatus which uses asymmetrical blades of different sizes to excavate a tree and associated dirt ball which remains intact.

Another object of this invention is to provide such excavating and transplanting apparatus having a simple, one-piece curved tower which is pivotable between different positions.

Another object of this invention is to provide such excavating and transplanting apparatus which is capable of easy, efficient ground penetration during all seasons of the year without damage to the root ball.

Another object of this invention is to provide such excavating and transplanting apparatus having blades with a bevel on the outside of the blade which helps guide the blade inwardly and maintain a tight, intact dirt ball while cleanly shearing off all roots which it contacts.

Another object of this invention is to provide such excavating and transplanting apparatus which use replaceable, pliable wear elements for the contact surfaces between sliding parts.

Another object of this invention is to provide such excavating and transplanting apparatus which is shorter and narrower, yet heavier, and on which the center of gravity of the tree and dirt balls is closer to the center of gravity of the front wheels of Skid Loaders and the rear wheels of tractors and trucks, to better perform the excavating in confined areas and on larger trees and plants.

These and other objects of the present invention are provided by a vehicle-mounted apparatus for excavating and transplanting trees and the like having a plurality of blade assemblies mounted on a multi-sided, horizontally disposed frame for overlying and substantially surrounding an excavation site. Each blade assembly includes a curved, one-piece tower and a blade mounted on a slide assembly for reciprocation along the tower to effect penetration of the excavation site, and hydraulic power means for effecting reciprocation of the blade and slide. The slide assembly includes pliable, replaceable materials such as plastic and brass as the contact and sliding surfaces between the tower and the slide assembly. The tower is pivotable between a plurality of operational positions so as to be useful with a plurality of blades to remove sections of earth from the excavation area having different sizes, i.e., widths and depths, and having different shapes, e.g., a conical shape having parabolically curved sides or a truncated shape having parabolically curved sides. The blades are either a plurality of tree spade blades of a single size or, preferably, asymmetrical blades having different sizes which are positioned to effectively use the weight of the vehicle along with the hydraulic forces to excavate an earth section which remains intact about the root system of the tree.

BRIEF DESCRIPTION OF THE DRAWINGS

FIG. 4A is a front elevational view of the one-piece tower showing the position of the tower for use with parabolically curved blades with a flat bottom in solid lines and the position of the tower for use with parabolically curved blades with a pointed end in phantom lines;

FIG. 4B is a rear elevational view of the one-piece tower showing the position of the tower for use with parabolically curved blades with a flat bottom in phantom lines and the position of the tower for use with parabolically curved blades with a pointed end in solid lines;

FIG. 5A is a front elevational view of an asymmetrical parabolically curved blade with point shown mounted on a slide and tower; and showing in phantom lines the location of the bottom edge of a parabolically curved blade with flat bottom; this blade corresponds to blade 1 in the diagram of FIG. 2;

FIG. 5B is a front elevational view of an asymmetrical parabolically curved blade with point shown mounted on a slide and tower; and showing in phantom lines the location of the bottom edge of a parabolically curved blade with flat bottom; this blade corresponds to blade 4 in FIG. 2;

FIG. 6 is a sectional view taken along the lines 6—6 of FIG. 5B;

FIG. 7 is a diagramatic view illustrating in dotted lines the generally conical section of earth which may be removed using parabolically curved blades with a point according to the present invention;

FIG. 8 is a diagramatic view illustrating in dotted lines the generally truncated section of earth which may be removed using parabolically curved blades with a flat bottom according to the present invention;

FIG. 9 is a front elevational view of a slide assembly according to the present invention upon which a blade is mounted for reciprocating movement along a one-piece tower; and FIG. 10 is a bottom end view of the slide assembly illustrated in FIG. 9.

DESCRIPTION OF THE PREFERRED EMBODIMENT

Figure 1:
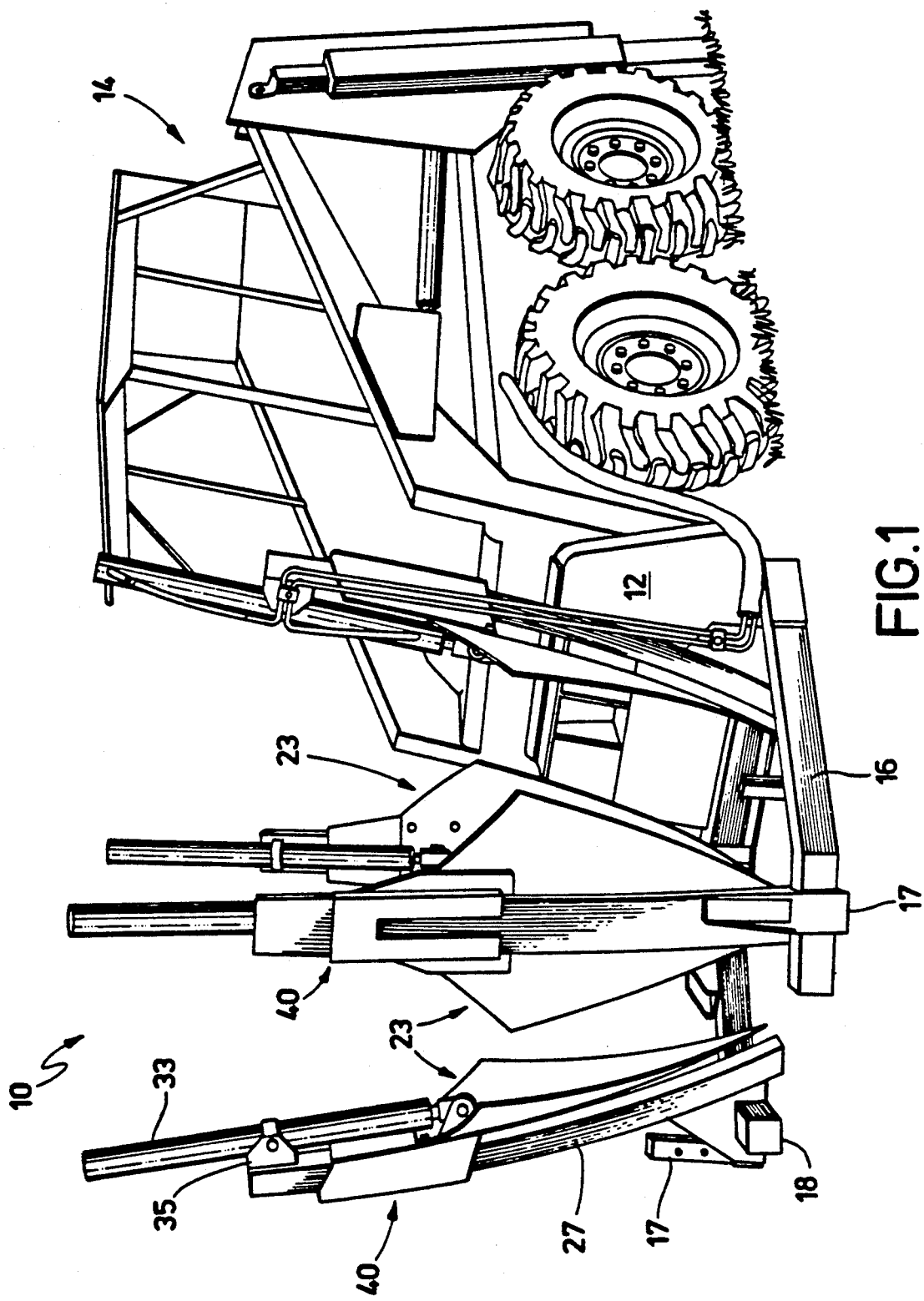
FIG. 1 is a perspective view of the excavating and transplanting apparatus of the present invention shown mounted on a vehicle.
Figure 2:
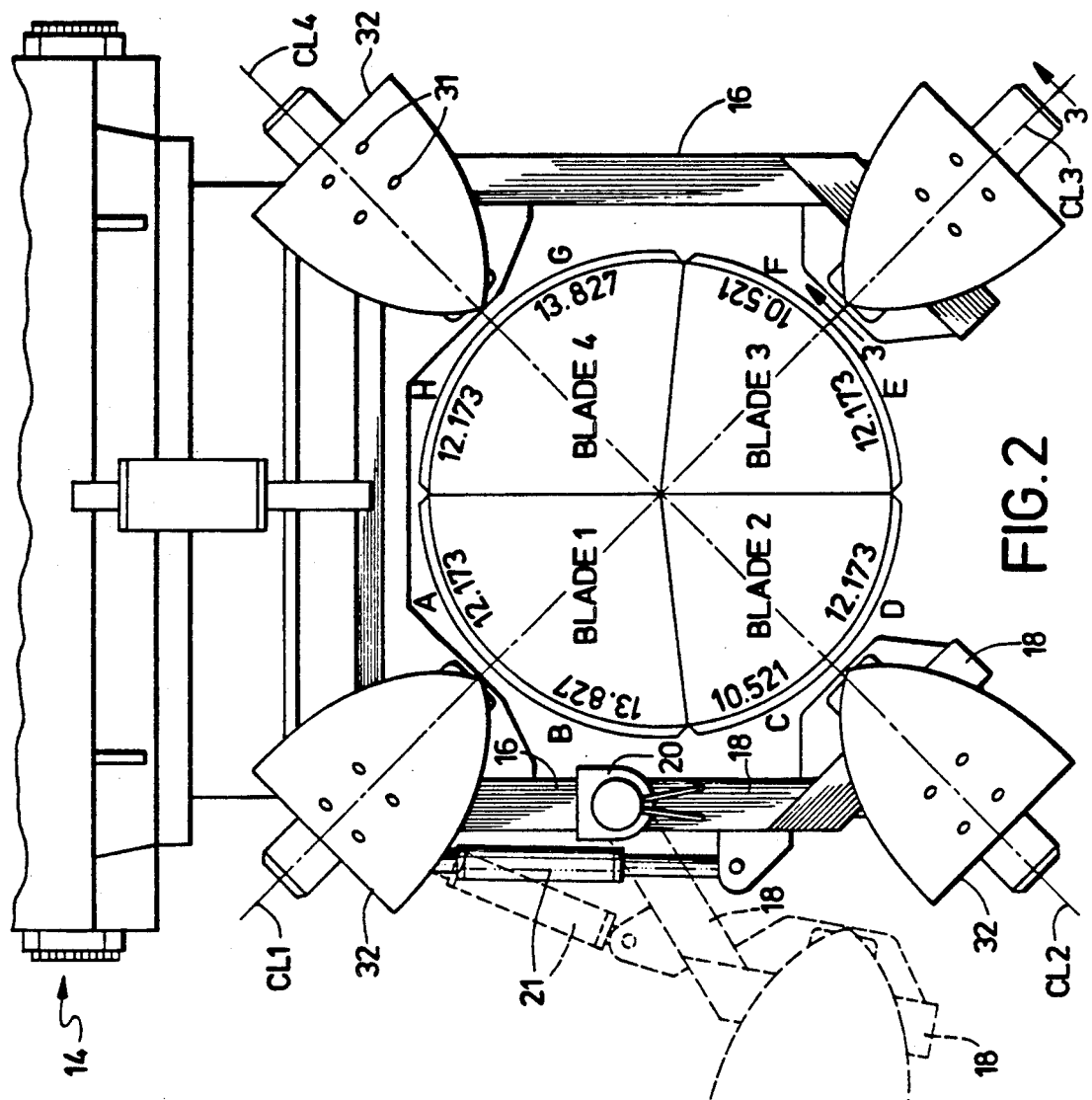
FIG. 2 is a top view of the apparatus of the present invention, including a diagram showing the asymmetry and relative sizes of the blades on a four-blade embodiment of the present invention.

Referring to the drawings, particularly FIGS. 1 and 2, an apparatus for excavating and transplanting trees and plants and an associated dirt ball from the surrounding soil is illustrated. The apparatus is generally indicated at 10 and is shown attached by suitable connections 12, such as a hydraulically-powered mounting plate, to a vehicle 14 such as the Bobcat Skid Steer Loader, or other suitable vehicle, the vehicle functioning to position the apparatus 10 about the plant to be excavated and provide mobility and power for the apparatus 10. The hydraulic fluid under pressure may be provided either by the vehicle 14 or by another source of fluid pressure, the connection of such apparatus to a hydraulic power supply and hydraulic controls being well-known. The excavating apparatus 10 may be raised and lowered and kept generally parallel to the ground in a manner well-known in the hydraulic art.

With continuing reference to FIGS. 1 and 2, the excavating and transplanting apparatus includes a generally horizontally disposed frame or base 16 which defines a substantially enclosed space for overlying and substantially surrounding an area to be excavated or a tree to be removed and transplanted. The frame 16 has a movable part 18 which is connected to frame 16 by a gate hinge 20. A hydraulic cylinder 21 having one end secured to the frame 16 and the other end to the movable part 18 functions to pivot the part 18 about the gate hinge 20 between the solid line position and the hidden line position illustrated in FIG. 2. As is conventional in machinery of this type, actuation of the various moving parts thereof is effected hydraulically by utilizing any conventional hydraulic power source, the utilization of such hydraulic power sources and the connections of the lines thereto being well-known in the art. The frame 16 may have levelers 17 associated therewith whereby the frame 16 may be positioned at different elevations above ground level to alter the size of the excavation and dirt ball in a manner well-known in the art.

Figure 3:
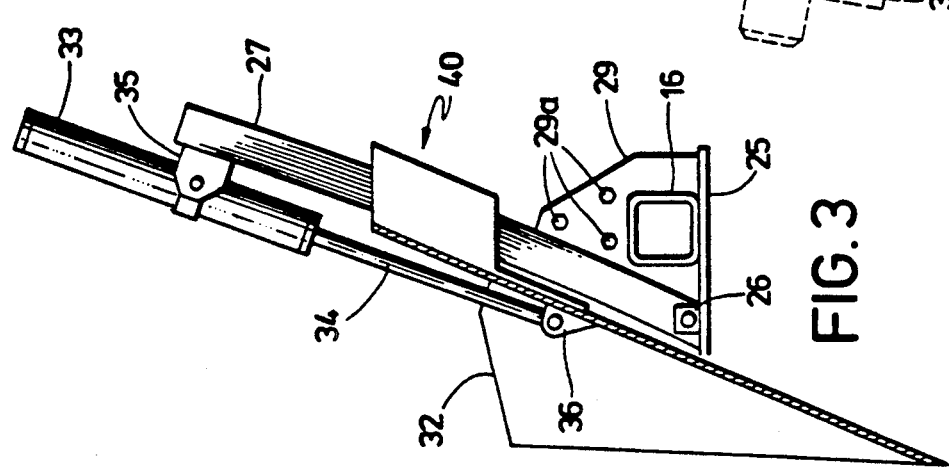
FIG. 3 is a sectional view of the blade and curved tower assembly taken along lines 3—3 of FIG. 2.

Four blade assemblies are indicated generally at 23 in FIGS. 1 and 2, and are illustrated in greater detail in FIGS. 3 and 5. The blade assemblies are mounted on the frame 16 and are centered on lines 90 degrees apart with respect to the centerline of the vehicle 14. Each blade assembly 23 includes a base plate 25 which is rigidly affixed to the frame 16, a curved, one-piece tower 27 which may be either rigidly affixed or, preferably, pivotally affixed to said base plate 25 at hinge lugs 26 and which extends upwardly therefrom. A tower brace 29 is rigidly affixed to the base plate 25 and extends upwardly therefrom. The tower brace 29 contains a plurality of bolt hole patterns for receiving bolts 29a as hereinafter described. A tower plate 28 is rigidly affixed to the tower 27 has bolt holes therein which match with the bolt holes in the tower brace 29 to receive the bolts 29a for supporting the tower 27 at different angles of inclination to the base as hereinafter described.

A slide assembly generally indicated at 40 is mounted on the tower 27, and is designed to be attached by bolts 31 to a blade 32. A hydraulic cylinder 33 having a cylinder rod 34 is attached by a cylinder mounting bracket 35 to the tower 27. The cylinder rod 34 is attached by a hinge pin to the blade 32 at hingle lugs 36.

As best illustrated in FIGS. 4A and 4B, the curved, one-piece tower 27 is pivotable about the hinge lugs 26 from a first position at 27' illustrated in solid line for use with parabolically curved blades having a flat bottom to produce the turncated-shaped dirt ball and excavation site having parabolically curved sides illustrated in FIG. 8; to a second position illustrated at 27" by the phantom lines for use with parabolically curved blades having a point to produce a conical dirt ball and excavation site having parabolically curved sides illustrated in FIG. 7. The tower plate 28 and the tower brace 29 have congruent bolt hole patterns therein which enable the tower 27 to be positioned at 27" for use with the curved blade with a point; or at the position indicated by 27' for use with the curved blade with a flat bottom. The tower 27 may be bolted either in position 27' or 27" using bolts 29a. The tower is a one-piece construction which is curved along its length for imparting and maintaining the desired angle of penetration to the blade 23 as it penetrates the earth.

To guide the blades 32 and maintain the blades in a regular and established converging path during downward reciprocal movement along the tower 27, each blade assembly is provided with a blade slide assembly 40 which is illustrated in detail in FIGS. 9 and 10. The slide assembly 40 includes a slide housing 41 which encircles the tower 27 and has a top indicated generally at 41a and a bottom indicated generally at 41b. The housing 41 may comprise a one-piece channel-type construction as illustrated or may comprise two angle irons welded at the toes. The slide housing 41 is adapted to slide along the tower 27 on an arrangement of plastic weir pads 42 and brass weir pads 44 positioned at the top and bottom of the housing as best illustrated in FIG. 9. The plastic weir pads 42 and brass weir pads 44 may be mounted in the housing 41 by mounting screws as is well-known in the art. The housing 41 is attached by welds 46 to a curved plate 48 which is contoured to fit the back of the blade 32. The curved plate 48 has four blade mounting holes 31a therein which are designed to align with the four bolt holes in the blade 32 whereby the blade 32 may be bolted by bolts 31 to the mounting plate 48. The housing 41 has a gap 50 therein which extends vertically along the rear thereof to enable the housing 41 to clear the tower brace 29 when the blade and attached slide housing 41 are in a lower or digging position.

The design of the slide assembly 40 and curved, one-piece tower 27 is an improvement over the prior apparatus used to hold and guide the blade during reciprocation. In prior devices when dirt or rocks or other debris became lodged in the blade guiding apparatus, the device would frequently bind or jam and had to be stopped for clearing of the obstruction. Also, some prior designs provided for metal sliding against metal which resulted in excessive wear and costly replacements. The prior designs did not allow for the apparatus to accommodate for the dirt or rocks and continue to function while clearing itself of the obstruction. In the present invention the only contact points between the slide assembly 40 and the tower 27 along which it slides are the plastic weir pads 42 and the brass weir pads 44. Plastic and brass are materials which have the characteristics of being durable, smooth, deformable and pliable. With such characteristics, the plastic and brass slide surfaces keep wear of the relatively higher priced tower to a minimum while providing for long-lasting and low-friction sliding surfaces. When dirt or rocks or other debris does get into the slide area between the plastic and brass weir pads and the tower 27, the plastic and brass pads are deformable and able to yield or score repeatedly without breaking or disintegrating. Thus, dirt or rocks merely become embedded in the plastic or brass while the slide assembly continues its reciprocating movement without binding or jamming.

The slide assembly 40 of the present invention provides approximately 36 square inches of plastic and brass contact area between the tower 27 and the slide pads 42 and 44. Graphite may be applied to the tower 27 to further reduce friction between the sliding surfaces. An important feature of the present invention is a slide assembly in which the plastic and brass weir pads are easily replaceable by removing the housing 41 from the tower 27 and merely unscrewing the mounting screws which hold the weir pads in place.

Referring now to FIGS. 2 and 5, the blades of the present invention are illustrated. Although the edges of the blades illustrated diagrammatically in FIGS. 5A and 5B are shown to be straight, the actual shape of the sides of the blades will be a parabolic curve as illustrated in FIG. 2. I have discovered that while my invention functions satisfactually and is an improvement over prior devices when using conventional blades, an improved excavation and dirt ball may be obtained with less damage and injury to the root system of the tree by using asymmetrical blades and/or blades of different sizes. FIG. 2 illustrates diagrammatically the width dimensions and relationships of four such asymmetical blades, two of which are larger than the other two, which function on a four-blade embodiment of my invention. The lines CL1, CL2, CL3 and CL4 represent the center lines of the four towers which are adjacent blades 1 through 4, respectively. The hinge lugs 36 on each blade will be aligned with the respective tower center lines to produce an asymmetrical blade having the dimensions shown in FIG. 2. The letters A through H represent the arcs of the asymmetrical blades as indicated and as stated in inches in the following schedule:

| Arc | Width | Width | Arc |
|---|---|---|---|
| | BLADE 1 | | BLADE 4 |
| A | 12.173" | 12.173" | H |
| B | 13.827" | 13.827" | G |
| | BLADE 2 | | BLADE 3 |
| C | 10.521" | 10.521" | F |
| D | 12.173" | 12.173" | E |

With continuing reference to FIGS. 2 and 5, I have discovered that using larger blades located nearer to the vehicle where the added digging weight of the vehicle is located makes digging easier and produces a better dirt ball.

Referring to FIGS. 5A and 5B, the parabolically curved blade having a point illustrated has an overall dimension from top to point of 39 inches and has a digging depth of 28 inches. The blade has a thickness of ¼ inch and is made from T1 grade steel. The blades illustrated in FIGS. 5A and 5B represent blades 1 and 4 in FIG. 2. The blades 2 and 3 illustrated in FIG. 2 will have the same overall height dimension of 39 inches, and will be asymmetrical, having the width dimensions on either side of the hinge lugs 26 as indicated in FIG. 2 and the above schedule.

With respect to the use of asymmetrical blades of different sizes, the above-stated dimensions for the blades illustrated in FIG. 2 as blades 1, 2, 3, and 4 are not critical, different combinations of sizes of blades and degrees of asymmetry being possible to produce the result of this invention. Many combinations of asymmetrical blades of different sizes are possible to produce the result of this invention, the above specific examples merely being one embodiment thereof.

The asymmetrical blades of different sizes function to allow the two larger area blades next to the vehicle where the heavier weight is located to perform most of the digging function, whereby the distribution of the weight and the relative sizing of the blades and the sharpness and curvature of the blades cooperate to produce a dirt ball which is not substantially disturbed during digging.

Referring now to FIG. 6, which is a section taken along the line 6—6 in FIG. 5B, the edge of one of the blades of the present invention is illustrated. The blade edge has a single-side bevel of a 45 degree edge which I have found will penetrate the earth and produce a parabolically curved path which shears the tree roots better, closes the gaps in the blade formation around the dirt ball, and helps keep the blades on the desired course during penetration of the earth.

Referring now to FIG. 7, there is diagramatically illustrated the shape of a dirt ball which may be excavated with the present invention using the parabolically curved blade with a point. The dirt ball which is indicated generally by 54 has the contour of a parabolic curve which is produced by the curved, bevel sided blades of the present invention.

Referring now to FIG. 8, there is diagramatically illustrated a dirt ball which may be excavated using a parabolically curved blade with a flat bottom of the present invention. The parabolically curved blade with a flat bottom will have the same overall shape and dimensions of the parabolically curved blade with a point shown in FIGS. 5A and 5B, however the flat bottom blade will be shorter as is indicated by the hidden line 55 in FIGS. 5A and 5B. The dirt ball which is produced by the parabolically curved blade with a flat bottom is generally indicated at 56. The parabolically curved blades having a flat bottom produce a relatively short dirt ball as compared to the parabolically curved blade with a point.

The present invention may be used both to prepare a hole into which a tree or other plant is to be located and, as the device creates a hole of the same size and shape as the mass of the earth and roots of the plant being moved, it is apparent that such an arrangement is highly advantageous as it reduces to a minimum the amount of back-filling required.

It is apparent that the present invention of an apparatus for excavating and transplanting trees and similar plants provides a machine that is simple yet rugged in construction and efficient to use. The device is compact so as to be usable in areas where very little space is available for maneuvering the blade assemblies without damaging adjacent trees and shrubs. The blades are changeable by simply removing four restraining bolts and disconnecting the hydraulic piston. The device is usable with either truncated blades for short dirt balls or pointed blades for conically shaped balls. All of the hydraulic blade actuating cylinders are carried inside the towers which prevents damage to low hanging limbs on adjacent trees. The invention features a curved tower which is pivotable between first and second positions for digging either a 30 inch diameter by 28 inch deep cone shaped dirt ball or a 30 inch diameter by 24 inch deep truncated dirt ball. The design permits the operator to view the excavation area. The heavier weight of the design helps hold the apparatus to the ground for offsetting the forces needed to successfully dig root balls without tearing the roots. Furthermore, the design positions the mass of the weight of the apparatus closer to the vehicle center of gravity, whereby the combined weight of the vehicle and apparatus function to place more weight on the larger blades for easier digging with less damage to the root ball.

In the operation of the preferred embodiment, when a tree or shrub or other plant is to be moved from the location in which it has grown, the transplanting device is maneuvered around the tree or shrub so that the center of the plant is located approximately equidistant from the four blades of the transplanting apparatus. If required, the gate 18 on the frame 16 may be pivoted outwardly (FIG. 2) to enable the apparatus to be readily positioned around a plant even within the narrow confines of a nursery row where the plants are normally on approximately 4' four foot centers. The gate arrangement permits the frame 16 and the blades 32 to be positioned about a plant with the frame 16 located so that the towers 27 are positioned at 90 degree intervals. As the frame 16 may also be displaced laterally and vertically relative to the vehicle 12, it is possible to position the excavating apparatus about a tree or shrub in a very confined area without contact or damage to adjacent trees and shrubs. Once the apparatus 12 is positioned relative to the tree or shrub, the frame 16 is lowered such that frame 16 comes to rest upon leveler pads 17. The adjusted position of the leveler pads 17 has a definite bearing upon the depth of the ball excavated. Thus, through the use of standard levelers, the apparatus of the preferred embodiment enables the excavation of dirt balls having diameters of 24, 26, 28 and 30 inches. When the apparatus 12 has been properly positioned about the plant to be moved, the blades are forced fully into the ground where they meet to form either a conical or truncated confinement about the root system of the tree, such as a shape illustrated in FIGS. 7 and 8 depending upon the choice of blades and the position of the tower 27. As the blades penetrate into the ground they shear off any roots protruding beyond their path of travel while maintaining the soil around the root system in close contact with the remaining roots. Preferably, the hydraulic cylinders are operated separately and in alternating rotations so as to force each blade uniformly into the ground by a series of short increments. When the blades have fully penetrated the ground, the lifting apparatus of the vehicle on which the transplanting device is mounted is actuated to raise the transplanting device and the tree and its root system and the ball of earth from the ground. The tree may now be moved to its desired location while carried by the blades of the transplanting device or the blades may be withdrawn and the root system and its accompanying ball of earth balled and bagged at the excavation site for transportation and/or later transplant.

The present invention has been described in detail with regard to its preferred embodiment in a tree excavating and transplanting apparatus utilizing four blade assembly units. However, as those skilled in the art will readily understand, modifications and variations may be resorted to without departing from the substance or scope of the present invention. Specifically, it is contemplated that the features of the present invention may be equally adaptable for use in a tree excavating and transplanting apparatus utilizing other combinations or numbers of blade units, such as three or five or more. Such modifications and variations are within the scope of the present invention, which is intended to be limited only by the appended claims and equivalents thereof.

I claim:

1. Apparatus for excavating and transplanting trees comprising:
    a generally horizontally disposed multi-sided frame defining a substantially enclosed space for overlying and substantially surrounding an area to be excavated;
    a plurality of blade assemblies mounted on said frame, each blade assembly including
        a tower affixed to and extending upwardly from said frame, said tower being a one-piece construction having a curved shape;
        a slide assembly mounted on and capable of sliding movement along said tower, said slide assembly having means mounted therein which contact said tower and on which said sliding movement occurs;
        a blade affixed to and movable with said slide assembly, and
    power means to actuate said blade and impart reciprocal movement thereto.

2. An apparatus for excavating and transplanting trees according to claim 1 wherein said means mounted in said slide assembly which contact said tower comprise pliable materials.

3. An apparatus for excavating and transplanting trees according to claim 1 wherein said frame is characterized further in that at least one side of said frame is pivotable outwardly with respect to said enclosed space to facilitate positioning of said frame about a tree to be excavated or transplanted.

4. An apparatus for excavating and transplanting trees according to claim 1 wherein said blade has an asymmetrical shape.

5. An apparatus for excavating and transplanting trees according to claim 1 wherein said plurality of blade assemblies includes blades having two sizes.

6. An apparatus for excavating and transplanting trees according to claim 1 further comprising a vehicle to which said apparatus is attached and wherein there are four blade assemblies mounted on said frame at spaced positions 90 degrees apart with respect to the center line of said vehicle.

7. An apparatus for excavating and transplanting trees according to claim 1 wherein said slide assembly further includes a mounting plate having the shape of said blade and wherein said blade is affixed to said mounting plate by bolts.

8. An apparatus for excavating and transplanting trees according to claim 1 wherein said power means comprises hydraulic actuating means operatively connected to said blade.

9. An apparatus for excavating and transplanting trees according to claim 1 wherein said tower is pivotally affixed to said frame to be pivotable to any one of a plurality of positions, each position being useful with a particular blade to provide an excavation having a particular size and shape.

10. An apparatus for excavating and transplanting trees according to claim 1 wherein said means mounted in said slide assembly which contact said tower comprise plastic materials.

11. An apparatus for excavating and transplanting trees according to claim 1 wherein said means mounted in said slide assembly which contact said tower comprise brass materials.

12. Apparatus for excavating and transplanting trees comprising:
    a generally horizontally disposed multi-sided frame defining a substantially enclosed space for overlying and substantially surrounding an area to be excavated;
    a plurality of blade assemblies mounted on said frame, each blade assembly including
        a tower affixed to and extending upwardly from said frame;
        a slide assembly mounted on and capable of sliding movement along said tower;
        an asymmetrical blade affixed to and movable with said slide assembly, and
    power means to actuate said blade and impart reciprocal movement thereto.

13. An apparatus for excavating and transplanting trees according to claim 12 wherein said plurality of blade assemblies includes blades of two sizes.

14. An apparatus for excavating and transplanting trees according to claim 12 further comprising a vehicle on which said apparatus is mounted, and wherein said plurality of blade assemblies comprises four blade assemblies mounted on said frame at spaced positions 90 degrees apart, two of said blades being larger than the other two, the two larger blades being mounted closer to said vehicle than the two smaller blades.

15. An apparatus for excavating and transplanting trees according to claim 12 wherein said frame is further characterized in that at least one side of said frame is pivotable outwardly with respect to said enclosed space to facilitate positioning of said frame about a tree to be excavated or transplanted.

16. Apparatus for excavating and transplanting trees comprising:
    a generally horizontally disposed multi-sided frame defining a substantially enclosed space for overlying and substantially surrounding the area to be excavated;
    a plurality of blade assemblies mounted on said frame, each blade including
        a tower pivotally affixed to and extending upwardly from said frame, said tower being a one-piece construction having a curved shape and being pivotable to any one of a plurality of positions to excavate any one of a plurality of earth shapes;

a slide assembly mounted on and capable of sliding movement along said tower, said slide assembly having pliable means therein which contact said tower and on which said sliding movement occurs, and having a mounting plate thereon;

an asymmetrical blade affixed to said slide assembly mounting plate; and power means to actuate said blade and impart reciprocal movement thereto.

17. An apparatus for excavating and transplanting trees according to claim 16 further comprising asymmetrical blades of two sizes.

* * * * *